United States Patent [19]

Kawasaki

[11] Patent Number: 5,742,790
[45] Date of Patent: Apr. 21, 1998

[54] DETECTION CIRCUIT FOR IDENTICAL AND SIMULTANEOUS ACCESS IN A PARALLEL PROCESSOR SYSTEM WITH A MULTI-WAY MULTI-PORT CACHE

[75] Inventor: Takashi Kawasaki, Machida, Japan

[73] Assignee: Kabushiki Kaisha Toshiba, Kawasaki, Japan

[21] Appl. No.: 416,475

[22] Filed: Apr. 4, 1995

Related U.S. Application Data

[63] Continuation of Ser. No. 873,127, Apr. 24, 1992, abandoned.

[30] Foreign Application Priority Data

Apr. 24, 1991 [JP] Japan .................. 3-094068

[51] Int. Cl.$^6$ ............................................. G06F 12/08
[52] U.S. Cl. ........................................ 395/455; 395/458
[58] Field of Search ................................ 395/455, 458, 395/403

[56] References Cited

U.S. PATENT DOCUMENTS

| | | | |
|---|---|---|---|
| 4,853,846 | 8/1989 | Johnson et al. | 395/281 |
| 4,905,141 | 2/1990 | Brenza | 395/456 |
| 5,056,002 | 10/1991 | Watanabe | 395/446 |
| 5,113,506 | 5/1992 | Moussouris et al. | 395/403 |
| 5,247,649 | 9/1993 | Bandoh | 395/457 |
| 5,274,790 | 12/1993 | Suzuki | 395/460 |

*Primary Examiner*—Eddie P. Chan
*Assistant Examiner*—Reginald G. Bragdon
*Attorney, Agent, or Firm*—Foley & Lardner

[57] ABSTRACT

A detection circuit for detecting a simultaneous and identical access signal in a parallel processor. The detection circuit includes a cache memory, having multiple ports, for generating a SAME WAY HIT signal; a control signal generating circuit for generating and providing a control signal to the cache memory and for receiving the SAME WAY HIT signal from the cache memory; and adders for sending memory address signals, including a set address signal, to the cache memory through each of the multiple ports. Also included is a circuit for retrieving a set address signal from the memory address signals provided by the adders and for sending the set address signals to the control signal generating circuit, the set address being a part of a memory address signal; and an AND gate, provided the set address signals and the SAME WAY HIT signal to be sent to the control signal generating circuit, for comparing the set address signals to the cache memory and informing whether the set address signals are identical and simultaneously accessed or not.

4 Claims, 8 Drawing Sheets

5,742,790

DETECTION CIRCUIT FOR IDENTICAL AND SIMULTANEOUS ACCESS IN A PARALLEL PROCESSOR SYSTEM WITH A MULTI-WAY MULTI-PORT CACHE

This application is a continuation of application Ser. No. 07/873,127, filed Apr. 24, 1992, now abandoned.

BACKGROUND OF THE INVENTION

1. Field of the Invention

This invention relates to a central processing unit (CPU) in which an identical and simultaneous access signal (referred to as SAME ADDRESS signal hereinafter) is generated and sent to a cache memory. It relates more particularly to an improvement of a circuit in terms of the processing speed of the signal and the circuit scale.

2. Description of the Prior Art

The conventional central processing unit (which will be referred to as a processor hereinafter) of super scaler type is equipped with two or more arithmetic units and a multi-port cache memory in order to simultaneously process a plurality of instructions.

FIG. 1 is an example of a format of a memory address signal expressed with a tag address of 18 bits, a set address of 64 sets (6 bits) and an in-block address of 6 bits, thus making a 30-bit signal example. A set address having 64 addresses is shown in FIG. 2, and corresponds to 1 2 3 . . . 63 64. The tag address is an upper address of a main memory address. The in-block address is the address that indicates which word (byte) to select among data read out.

FIG. 2 is a cache memory corresponding to FIG. 1 constituted by a direct mapping with a single WAY. The number of the tag address selected at the same set address is called the number of WAY. Put in another manner, the number of WAY (i.e., WAY number) corresponds to the number of different methods to divide a storage region of memory. When the number of WAY is 1, it means that there is an address to be compared for a tag address and it is called the direct mapping.

FIG. 3 is a block diagram of the conventional processor using the cache memory in FIG. 2.

FIG. 4 is a cache memory corresponding to FIG. 1 constituted by a set associative with four WAYs. The set associative is for a memory with the number of WAY and the number of set each being more than one (i.e. the number of WAY is not 1, and the number of set is not 1).

FIG. 5 is a block diagram of the conventional processor using the cache memory in FIG. 4.

Referring to FIG. 3, an access signal generating circuit 12 (which will be referred to as SAME ADDRESS signal generating circuit hereinafter) and arithmetic units 13, 14 are connected to a cache memory 11. From each arithmetic unit 13, 14, the address signal of 30 bits is outputted to the cache memory 11 and the SAME ADDRESS signal generating circuit 12.

In the above processor, there sometimes occurs a simultaneous access in the cache memory, such as a load-load command, load-store command, store-load command and store-store command. Namely, there occurs a simultaneous access at the same address, therefore a data guarantee based on the order of the load-store command becomes necessary. The data guarantee means that when the store command is executed after the load command, it shall be guaranteed that the data is loaded before data is stored for particular cache memory address.

Therefore, a SAME ADDRESS signal which serves to indicate the existence of simultaneous access at the same address is output to the cache memory 11 from the SAME ADDRESS generating circuit 12. Referring to FIG. 6, all of the 30 bits output from the arithmetic circuits 13, 14 are compared to detect the existence of a simultaneous signal accessed at the same address.

Since the addresses output from the arithmetic circuits 13, 14 are compared at every bit, the circuit 12 becomes a large-scale circuit. Therefore, when the bit width of the address increases, the scale of the detection circuit 12 will also increase.

SUMMARY OF THE INVENTION

It is therefore an object of the present invention to provide a processor with a detection circuit for simultaneous and identical access, with a smaller scale circuit and a faster processing capability.

To achieve the object, there is provided a detection circuit comprising a cache memory having a multiple port, for generating a SAME WAY HIT signal; a control signal generating circuit for generating and providing a control signal to the cache memory and for receiving the SAME WAY HIT signal from the cache memory; address supply means for sending memory address signals including a set address signal to the cache memory through the multiple ports; a circuit for retrieving a set address signal from the memory address signals provided by the address supply means and for sending the set address signal to the control signal generating circuit, the set address being a part of a memory address signal; and an AND gate, provided in the control signal generating circuit, for comparing the set address signal and the SAME WAY HIT signal so as to send a control signal to the cache memory informing whether the signals are identical and simultaneously accessed or not.

Other features and advantages of the present invention will become apparent from the following description taken in conjunction with the accompanying drawings.

DETAILED DESCRIPTION OF THE PREFERRED EMBODIMENTS

Figure 7:
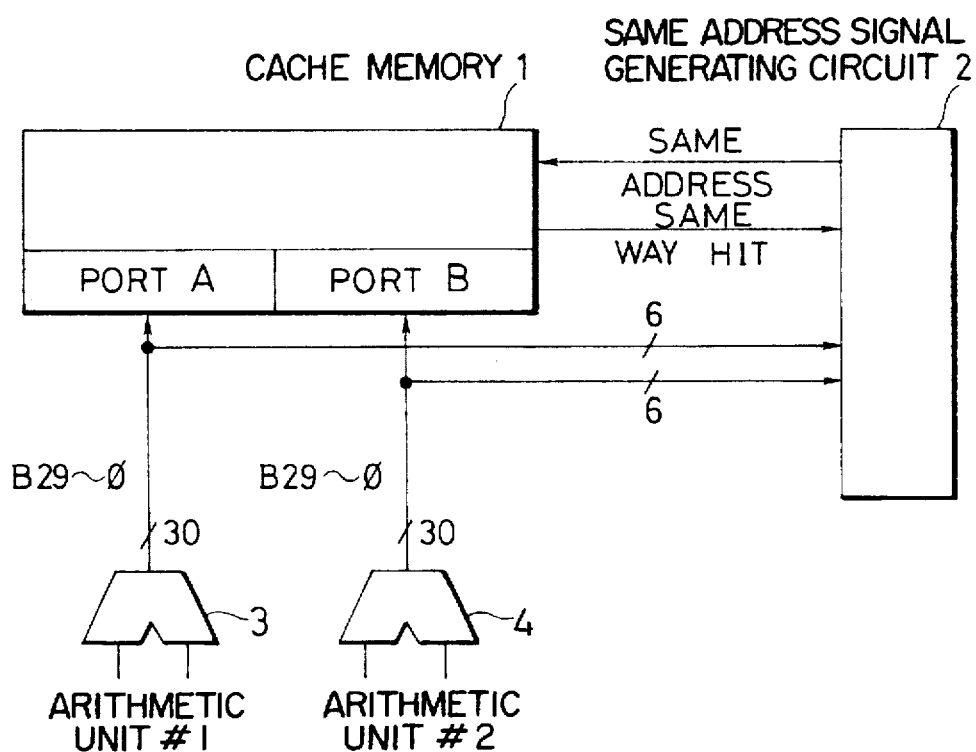
FIG. 7 shows a block diagram of a processor with a cache memory with a single way according to the present invention.

Referring to FIG. 7, an embodiment of a processor according to the present invention will be described in detail.

The processor shown in FIG. 7 is constituted by a cache memory 1, a SAME ADDRESS signal generating circuit 2 and arithmetic units 3, 4. There are provided, for example, two input ports A, B in the cache memory 1, each of which is connected to the arithmetic units 3, 4, respectively.

Figure 1:
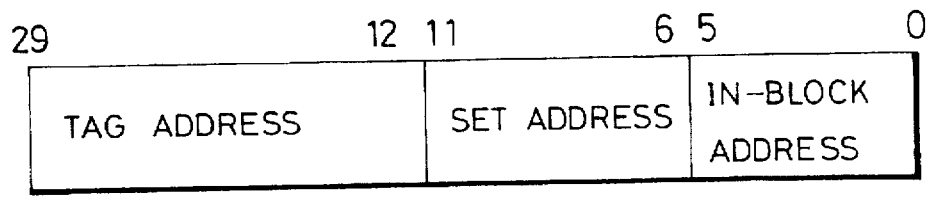
FIG. 1 shows a format of a memory address signal comprising a tag address of 18 bits, a set address of 64 sets (6 bits) and an in-block address of 6 bits, thus making an example of a 30-bit signal of the prior art.
Figure 2:
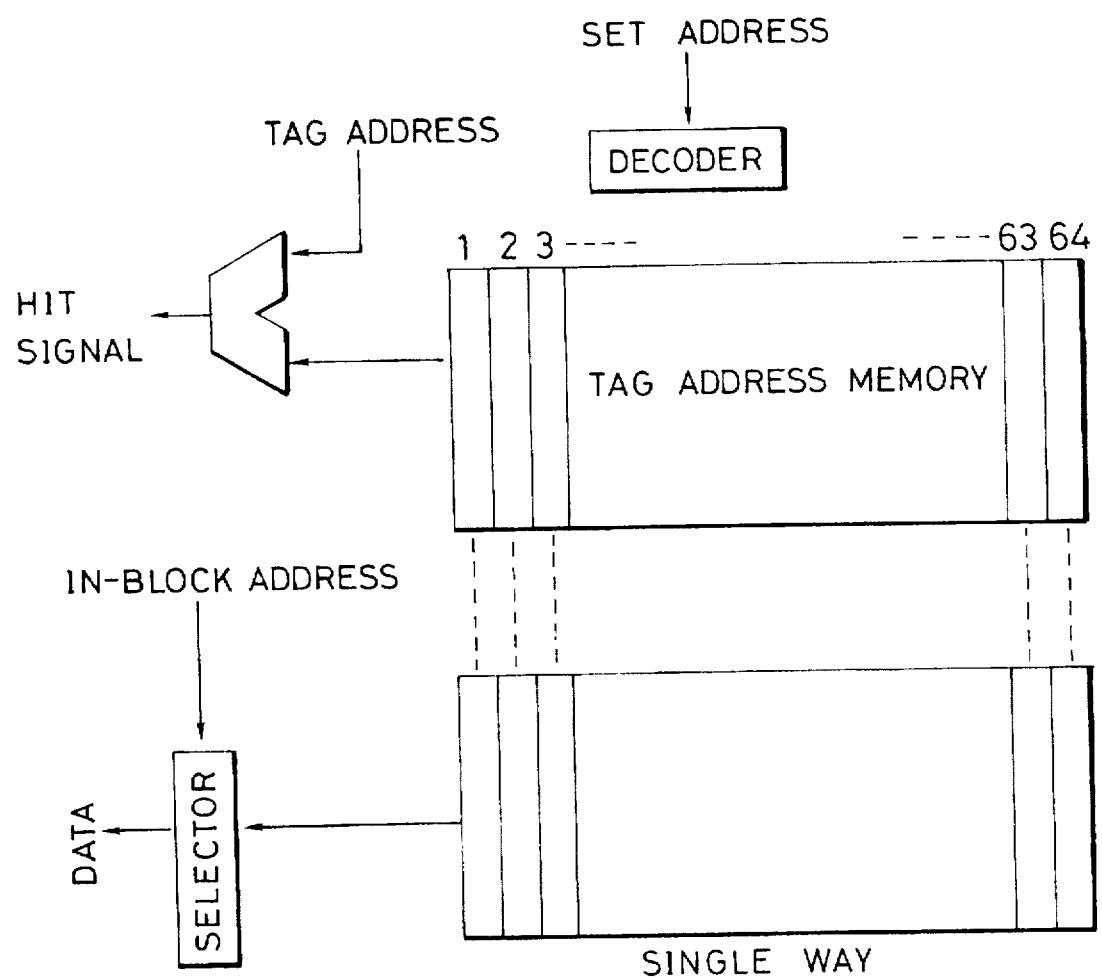
FIG. 2 shows a cache memory corresponding to FIG. 1 constituted by a direct mapping with a single WAY.
Figure 3:
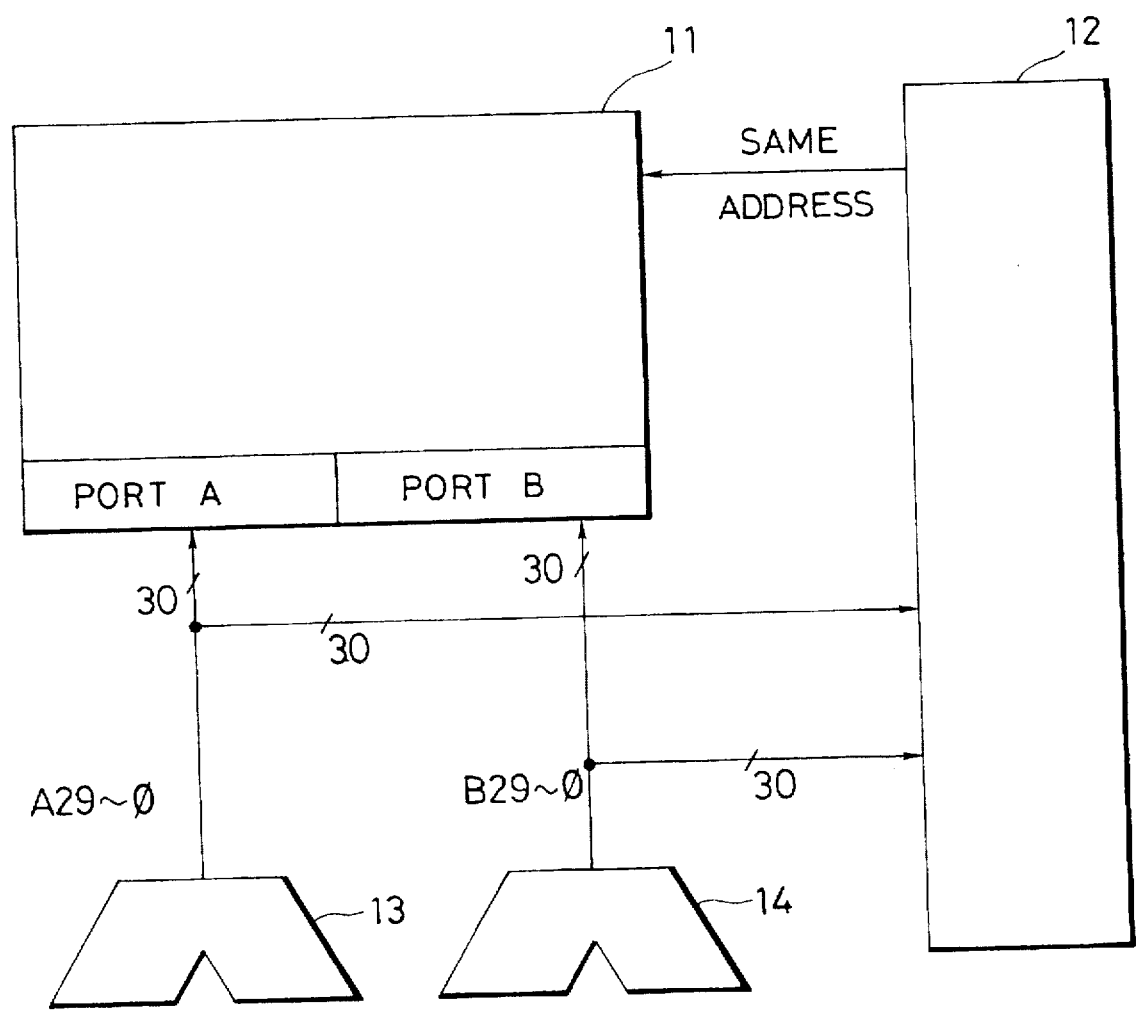
FIG. 3 shows a block diagram of the conventional processor using the cache memory in FIG. 2.
Figure 4:
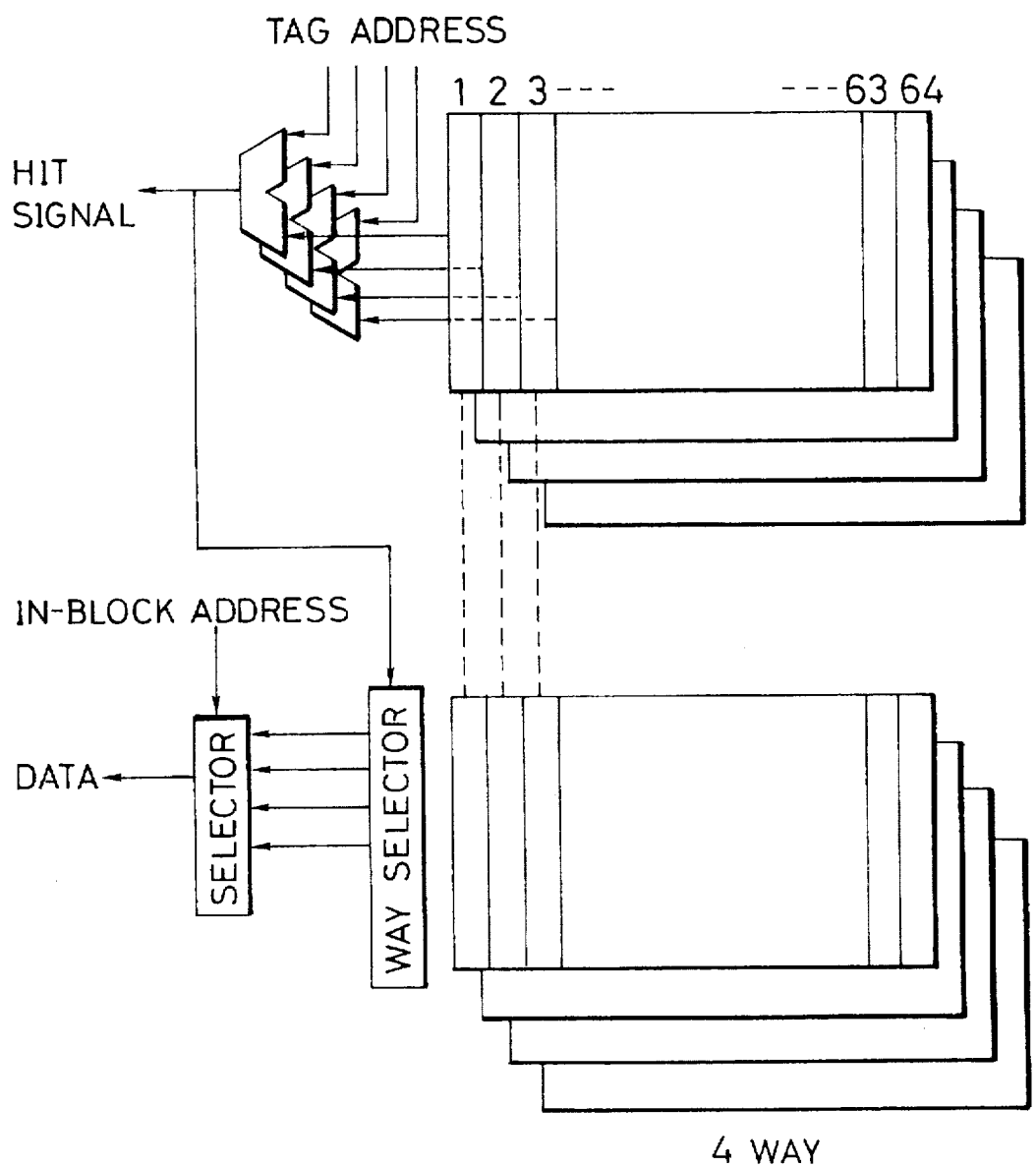
FIG. 4 shows a cache memory corresponding to FIG. 1 constituted by a set associative with four WAYs.
Figure 5:
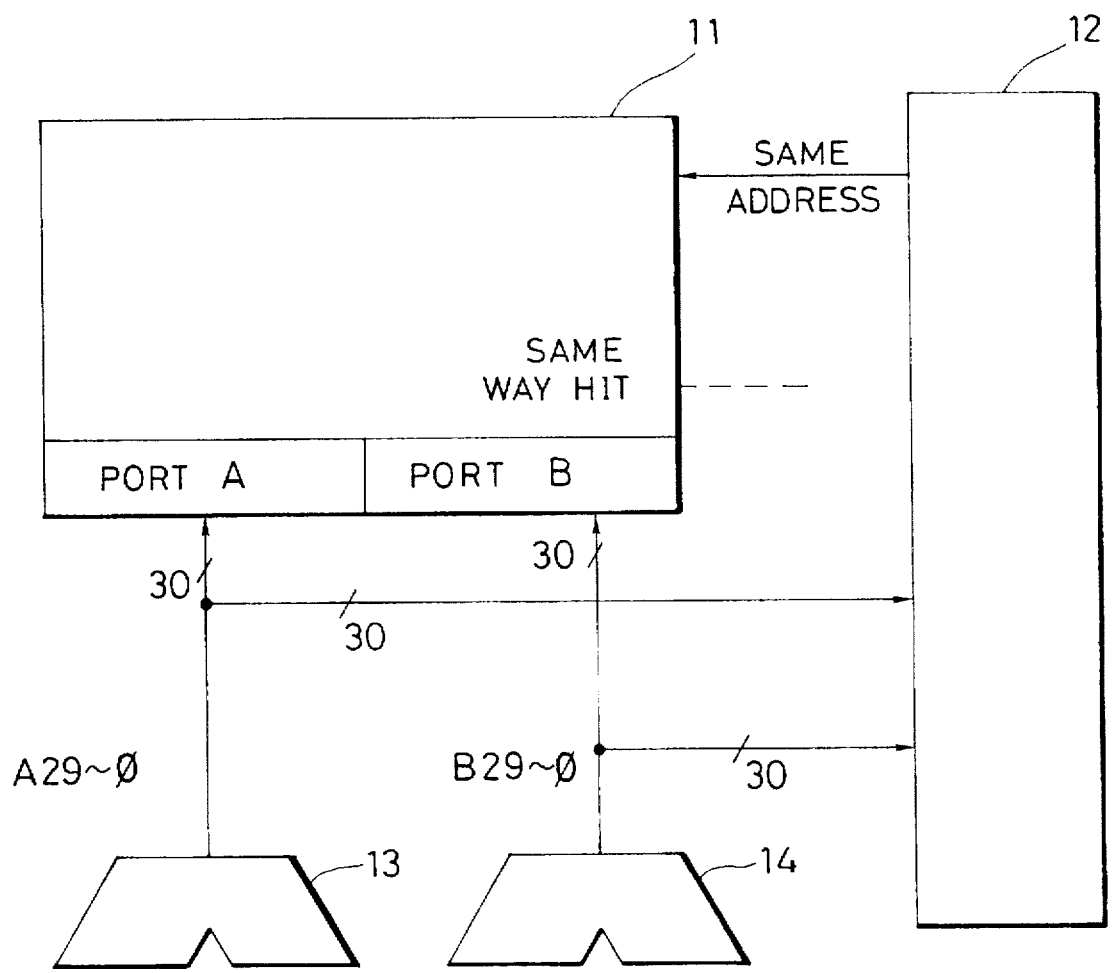
FIG. 5 shows a block diagram of the conventional processor using the cache memory in FIG. 4.
Figure 6:
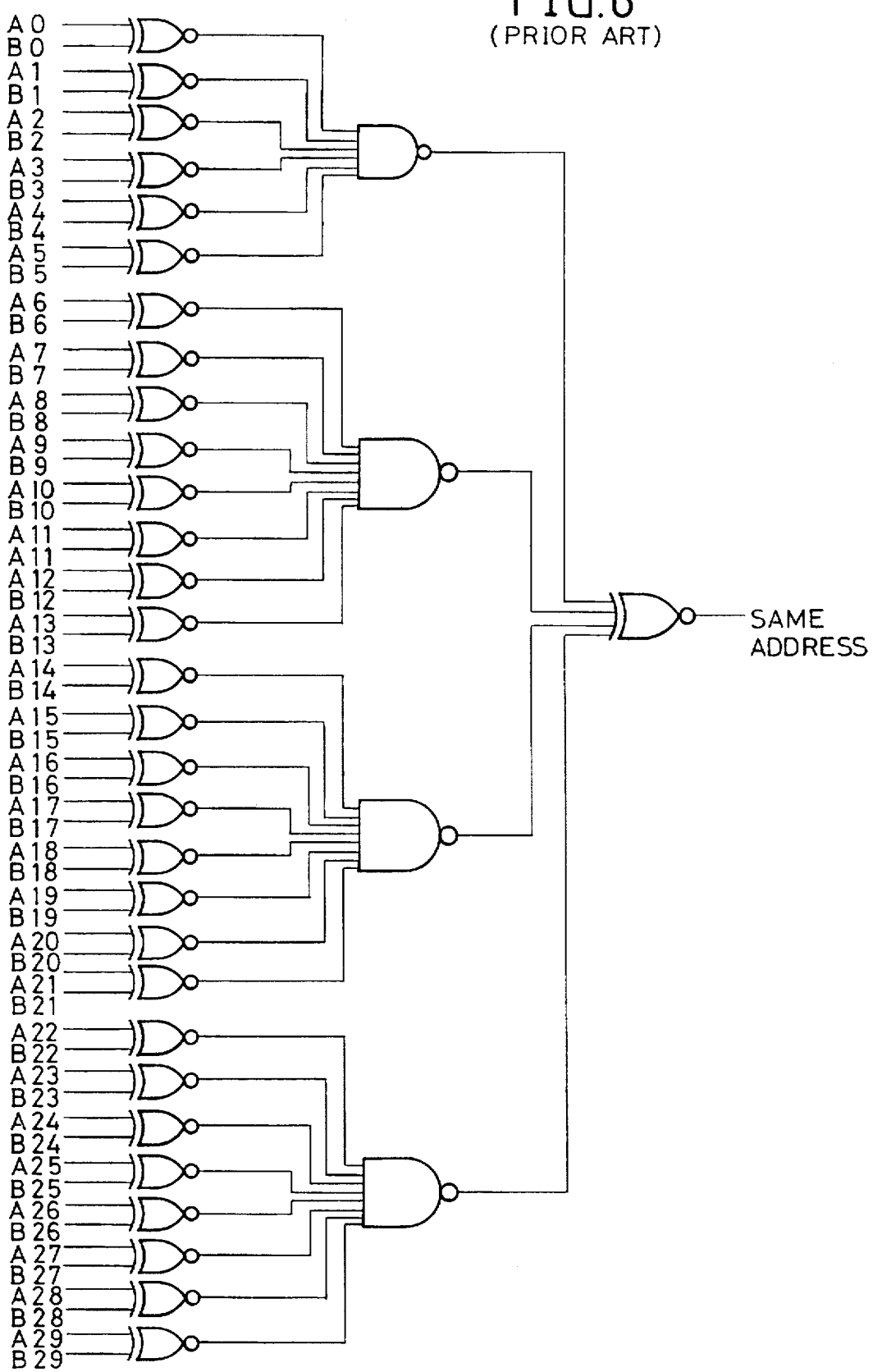
FIG. 6 shows a circuit diagram of the conventional processor shown in FIG. 5.
Figure 11:
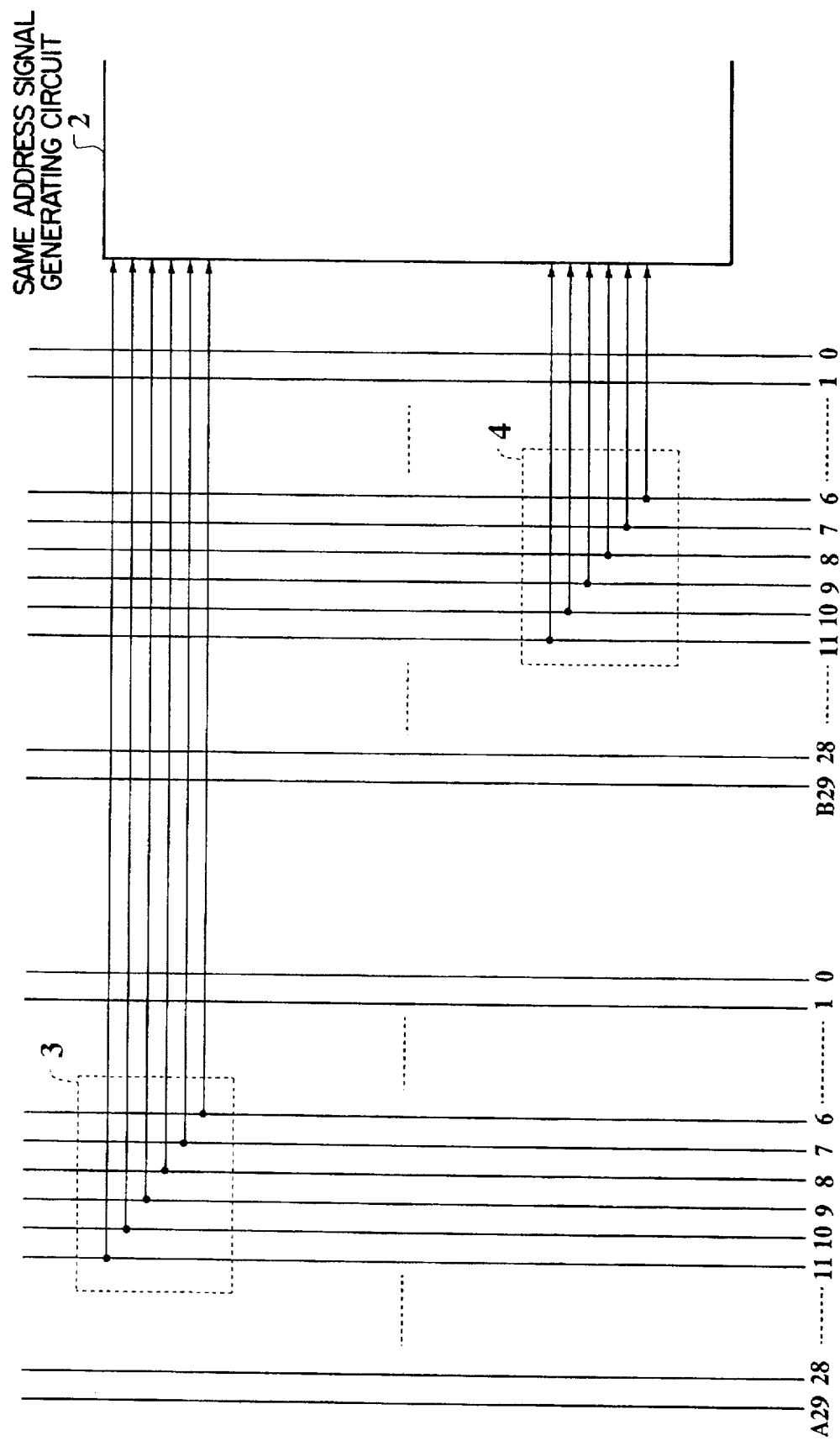
FIG. 11 shows a diagram in which 6 bits of the set address shown in FIG. 7 and FIG. 9 are retrieved for comparison.

All bits, for example, a 30-bit address signal, are input to the cache memory 1 from each arithmetic unit 3, 4. On the other hand, among the 30-bit address signal to be output from the arithmetic units 3, 4, some arbitrary number of bits, say 6 bits, are input to the SAME ADDRESS signal generating circuit 2. Here, the 6 bit address signal can be considered as a set address signal shown in FIG. 1. The address signal comprises a tag address, a set address and an in-block address. FIG. 11 illustrates an example in which the 6-bit set address is retrieved and sent to the SAME ADDRESS signal generating circuit 2. The portions indicated with broken lines with numerals 3, 4 in FIG. 11 correspond to the mechanisms for retrieving a set address signal.

In the cache memory 1 of the present invention, there is provided therein a circuit to generate a SAME WAY HIT signal, which is already existent in the conventional cache but is not used for "comparison" as explained in this specification. The SAME WAY HIT signal is a signal to indicate that the signal is accessing the same WAY as another signal on another part of the cache is accessing. In this invention, the SAME WAY HIT signal produced in the cache memory 1 is designed to be output to the SAME ADDRESS signal generating circuit 2.

Figure 8:
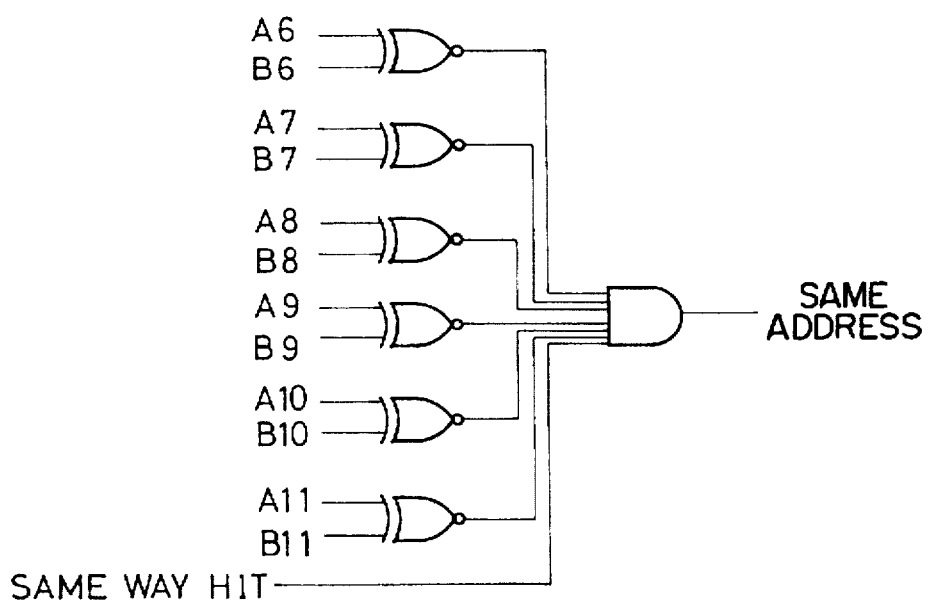
FIG. 8 shows a circuit diagram of the processor shown in FIG. 7.

FIG. 8 shows a circuit diagram of the SAME ADDRESS signal generating circuit 2. The SAME ADDRESS signal generating circuit 2 comprises six EXNOR gates and one AND gate.

The set addresses of 6 bits (namely, A6 through A11 and B6 through B11 shown in FIG. 8 or FIG. 10) output from the arithmetic units 3, 4 are input to the six EXNOR gates. Referring to FIG. 8, the SAME WAY HIT signal produced in the cache memory 1 and the output signals of the six EXNOR gates are input to the AND gate. The logical product of the comparison of the 6-bit set addresses and the SAME WAY HIT signal is taken to produce a SAME ADDRESS signal of 0 or 1, for example, indicating whether the signal is accessing the same address or not. This taking of the logical product is the "comparison" mentioned previously.

Figure 9:
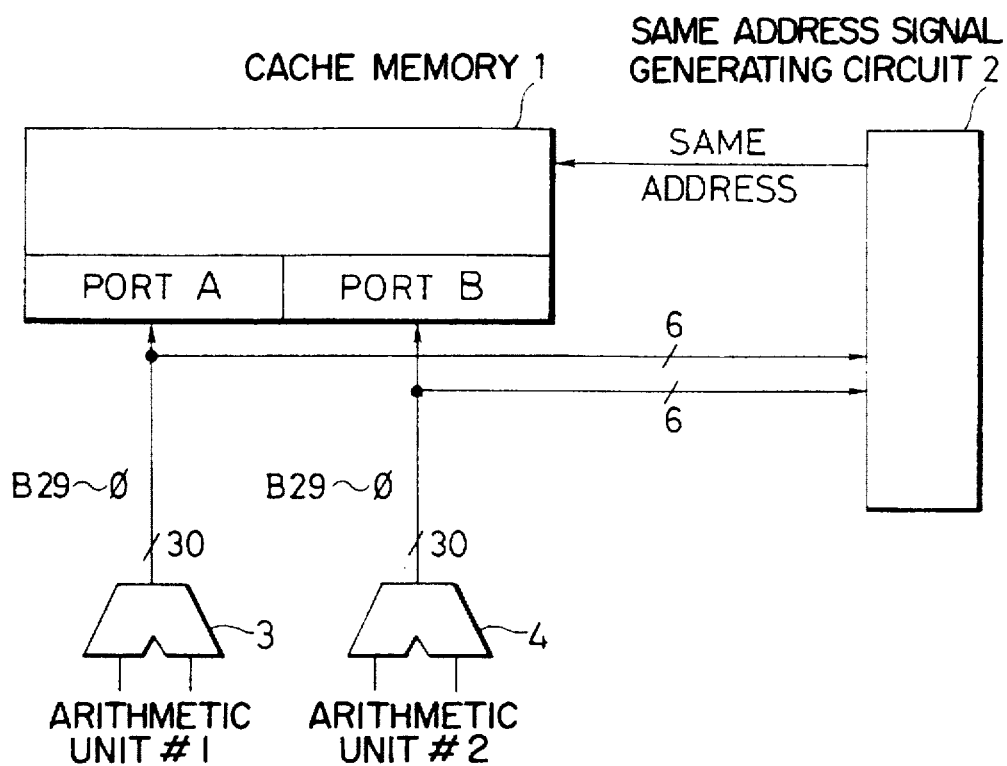
FIG. 9 shows a block diagram of a processor with a cache memory with 4 WAYs according to the present invention.

The SAME ADDRESS SIGNAL produced in the above manner is transferred to the cache memory 1 as shown in FIG. 9, so that it can notify the cache memory 1 whether it is the identical and simultaneous access signal or not.

It is to be noted that according to the above embodiment of the present invention, the 35 gates are reduced to 7 gates in terms of hardware, and the access processing speed becomes at least twice as fast.

Figure 10:
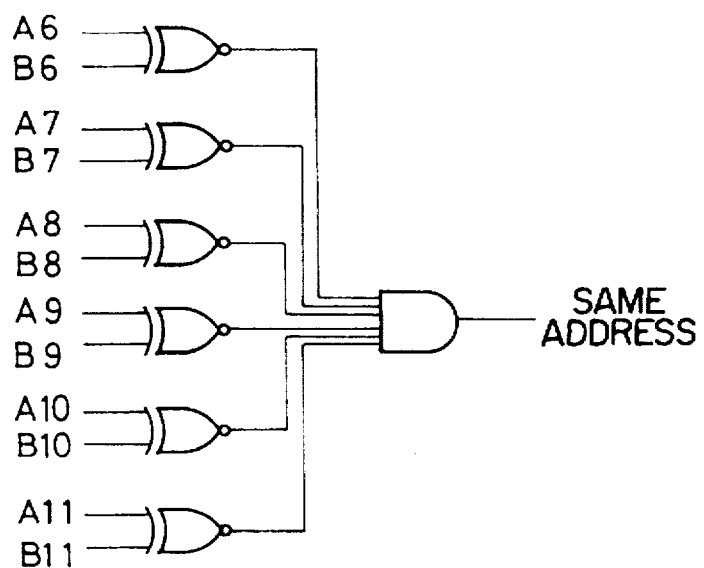
FIG. 10 shows a circuit diagram of a processor shown in FIG. 9.

It will be appreciated that when the cache memory is of a single WAY, the SAME WAY HIT signal show in FIG. 8 is no longer required for same address detection. Only the set addresses are compared for detecting the existence of a simultaneous signal accessed at the same address, as shown in FIG. 9 and FIG. 10.

In other embodiments of the present invention, there may be more ports than the exemplary 2 used in this description. Additionally, the cache memory, the control signal generating circuit, the address supply, and the retrieving means may all be fabricated on the same disk.

In summary, by employing a detection circuit for detecting the simultaneous access at the same address, in a parallel processor according to the present invention, the SAME ADDRESS signal generating circuit is significantly simplified by utilizing the SAME WAY HIT signal generating circuit which is provided in the cache memory 1 and also employing means to use only the set address, for instance 6 bits among a total of 30 bits of a memory address signal. The scale of a processor circuit is reduced significantly and the computing speed is improved substantially.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A detection circuit for identical and simultaneous access in a parallel processor system having a plural set of WAYs, comprising:

a cache memory having multiple ports and a plurality of storage locations for storing data, said cache memory generating a SAME WAY HIT signal indicating that an access on one of said multiple ports of said cache memory and a simultaneous access on another of said multiple ports of said cache memory are made to a same one of said plural set of WAYs in said cache memory;

address supply means for sending memory address signals to said cache memory through each of said multiple ports, each of said memory address signals including a tag address signal, a set address signal, and an in-block address signal;

means for retrieving corresponding set address signals from each of said memory address signals provided by said address supply means; and a control signal generating circuit configured to receive said corresponding set address signals from said retrieving means and said SAME WAY HIT signal from said cache memory, said control signal generating circuit including a logic circuit for comparing said corresponding set address signals to obtain comparison signals, and an AND gate for taking a logical product of said comparison signals and said SAME WAY HIT signal so as to create a control signal that is output to said cache memory and which indicates whether or not one of said plurality of storage locations in said cache memory is accessed through at least two of said multiple ports.

2. The detection circuit according to claim 1, wherein said cache memory, said control signal generating circuit, said address supply means, and said retrieving means are fabricated on a same chip.

3. The circuit of claim 1, wherein said address supply means comprises an arithmetic unit for each of said multiple ports of said cache memory.

4. The circuit of claim 3, wherein said retrieving means outputs only said set address signals to said control signal generating circuit, wherein said SAME WAY HIT signal produced in said cache memory and signals outputted from said retrieving means are input to said control signal generating circuit, and wherein said control signal generating circuit takes a logical product of said comparison signals and said SAME WAY HIT signal and produces a SAME ADDRESS signal indicating whether or not said one of said plurality of storage locations in said cache memory is simultaneously accessed as said control signal.

* * * * *